United States Patent [19]
De Simone et al.

[11] Patent Number: 5,160,606
[45] Date of Patent: Nov. 3, 1992

[54] GRAY WATER RECOVERY SYSTEM WITH OZONE TREATMENT

[76] Inventors: Mitch D. De Simone, 4374 Hillview Dr.; Bruce G. Heieren, 4380 Hillview Dr., both of Pittsburg, Calif. 94565

[21] Appl. No.: 681,130

[22] Filed: Apr. 5, 1991

[51] Int. Cl.$^5$ .......................... A61L 2/26; B01D 17/12
[52] U.S. Cl. .................... 210/110; 210/121; 210/167; 210/209; 210/232; 210/248; 422/186.07; 422/186.12
[58] Field of Search ................. 210/97, 121, 143, 167, 210/192, 209, 248, 257.1, 258, 110, 232, 206; 422/186.07, 186.12

[56] References Cited

U.S. PATENT DOCUMENTS

| | | | |
|---|---|---|---|
| 380,149 | 3/1888 | Timmons | 210/257.1 |
| 3,844,946 | 10/1974 | Farrell | 210/257.1 |
| 3,915,857 | 10/1975 | Olson | 210/257.1 |
| 4,134,833 | 1/1979 | McCormick | 210/121 |
| 4,145,279 | 3/1979 | Selby | 210/157 |
| 4,162,218 | 7/1979 | McCormick | 210/258 |
| 4,228,006 | 10/1980 | Hanna | 210/170 |
| 5,059,330 | 10/1991 | Burkhardt | 210/257.1 |

FOREIGN PATENT DOCUMENTS 2187194  7/1990  Japan ........................... 422/186.07

*Primary Examiner*—Robert A. Dawson
*Assistant Examiner*—Joseph Drodge
*Attorney, Agent, or Firm*—Bielen, Peierson & Lampe

[57] ABSTRACT

A waste water recovery system for transporting waste water to a reuse entity, such as an irrigation system, utilizing a holding tank having an upper portion and an opposite lower portion. A waste water conduit directs water into the holding tank. Water from the holding tank is transported through an outlet conduit by the use of a pump. An overflow conduit permits water to leave the waste water holding tank should excess amounts of waste water flow into the holding tank. A power switching mechanism activates the pump only when the holding tank contains a predetermined amount of waste water. The waste water is treated in the holding tank by gaseous ozone to obviate microbial activity.

9 Claims, 3 Drawing Sheets

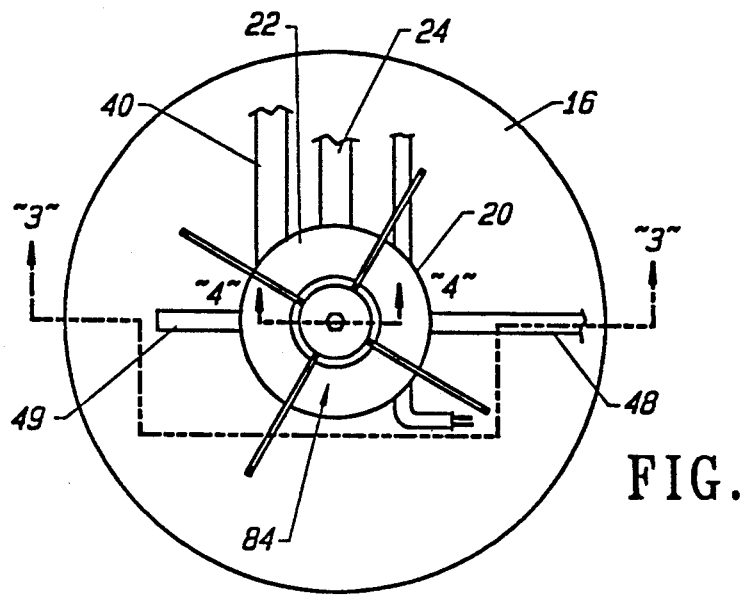
FIG. 2
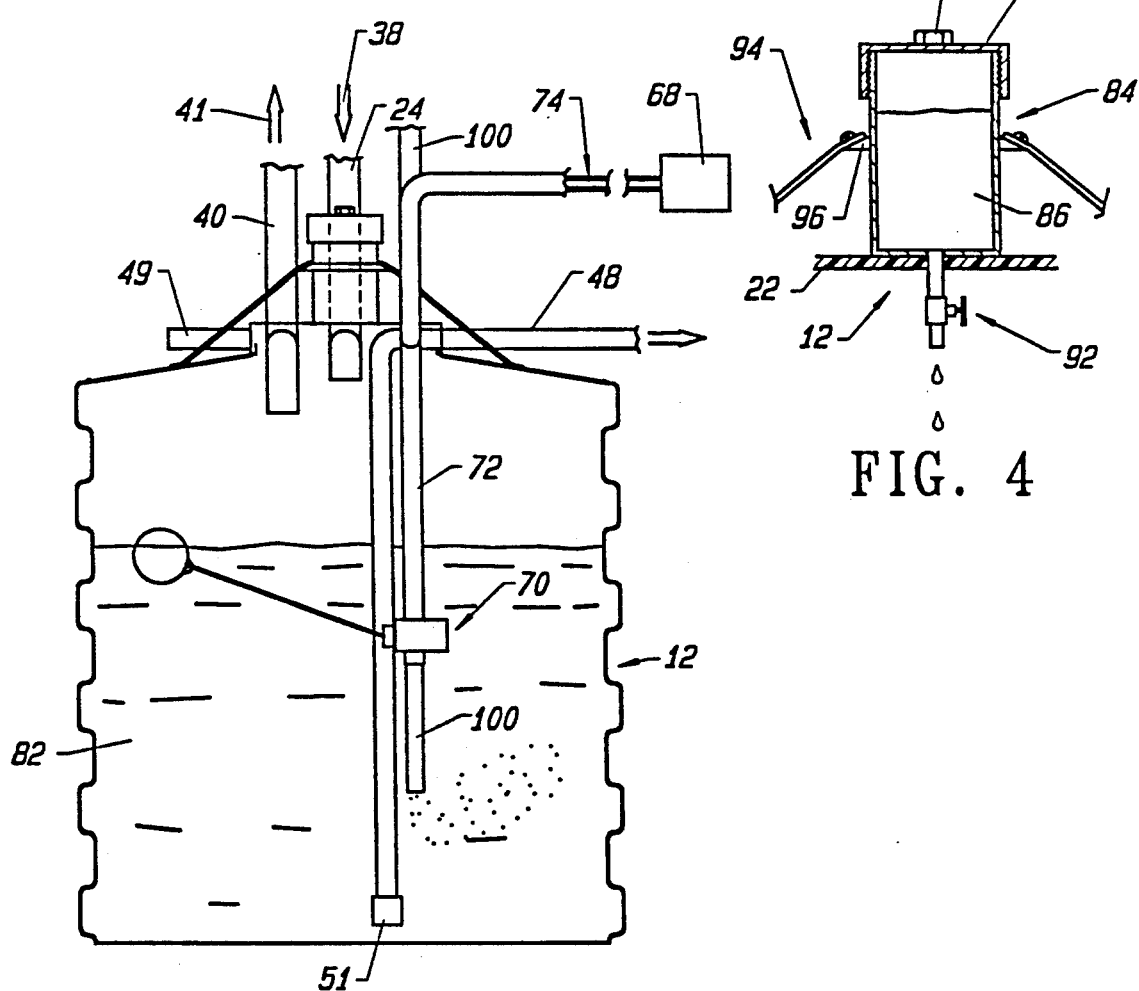
FIG. 4
FIG. 3

GRAY WATER RECOVERY SYSTEM WITH OZONE TREATMENT

BACKGROUND OF THE INVENTION

The present invention relates to a waste water recovery system which is especially useful in a typical household.

Water shortages have become very common in recent years due to the population growth in the world. Many solutions have been proposed for conserving water usage such as reducing the number of times a toilet is flushed, shortening the time of showers, eliminating lawns and other plants which require a large amount of water, and the like. Unfortunately, much water being used in a normal household is sent into the waste drain when such water might be used to irrigate plants in a yard. Such water is commonly known as "gray water", typically originating from a tub or shower, a washing machine, and certain wash basins. Dishwasher, kitchen sink, and garbage disposal water is generally not included in the category of "gray water".

In the past, persons have saved "gray water" in a bucket and transported the same to an area requiring irrigation. In addition, pumping "gray water" to irrigation sites without storing the same has also been proposed and employed. Unfortunately, "gray water" is often unused for lack of storage capacity of the same.

A waste water recovery system which includes a storage facility, which is biologically safe, and convenient to use would be a great advance in the water conservation field.

SUMMARY OF THE INVENTION

In accordance with the present invention a novel and useful waste water recovery system usable in a typical household is herein provided.

The waste water recovery system of the present invention includes as one of its elements a holding tank which may be above ground or partially below ground. The holding tank includes an upper portion with a removable top and an opposite lower portion. When the holding tank is at least partially underground, the lower portion would also be underground. The holding tank may include a collar or flange surrounding the opening which serves as a stiffening member as well as a support for the various conduits which feed into the holding tank, and will be described hereinafter.

A waste water conduit leads into the holding tank and carries waste water from a tub or shower. The normal connection of the tub or shower to the existing sewage system would be interrupted. An overflow conduit from the holding tank would be reconnected the existing sewage system to permit waste water to flow via the holding tank should the holding tank become full.

The waste water recovery system also employees an outlet conduit which transports waste water to a reuse entity such as a irrigation system. Pump means is employed for drawing water from the holding tank through the outlet conduit in this regard.

Switch means may also be used for activating the pump means when the holding tank contains a predetermined minimum amount of waste water. A float switch may be employed within the holding tank to acertain a proper water level therein. If insufficient water is in the holding tank a float switch would send a signal to a first relay which is normally closed (N.C.) to interrupt power to the pump means. A second relay which is normally open (O.C.), lies in series with the first relay which is normally closed. The normally open relay may be connected to a timing device which closes the normally open relay and, thus, activates the pump, assuming the flow switch is the proper position within the holding tank. The timer may also simultaneously send a signal to a conventional irrigation controller such that the associated irrigation manifold valves are opened.

Means is also included for treating the waste water within the holding tank. Such treating means may include means for selectively delivering disinfecting liquid or solid into the holding tank. Such means may take the form of a container mounted on the top portion of the holding tank with a valve permitting specific amounts of liquid or solid to enter the holding tank. In addition, the waste water treatment means may include an ozone source or ozonator i.e. a device which produces ozone. The ozonator, continually sends ozone through a conduit into the holding tank while the irrigation pumping is taking place.

It should be noted that the flange located on the top portion of the holding may serve as a support for the inlet and outlet waste water conduits, the overflow conduit, the ozone conduit, and a vent conduit. Thus, each conduit, as well as the container mounted to the top portion of the holding tank containing the disinfecting liquid, would be readily accessible at one portion of the holding tank. Normally, this portion of the holding tank would lie above ground which facilitates maintenance and repair.

It may be apparent that a novel and useful waste water or "gray water" recovery system has been described.

It is therefore object of the present invention to provide a waste water recovery system which is easily adaptable to a typical household.

It is another object of the present invention to provide a waste water recovery system which stores waste water automatically and eliminates any carrying of water from one place to another place.

Another object of the present invention is to provide a waste water recovery system which delivers waste water to an irrigation system that has been treated for microbial activity.

A further object of the present invention is to provide a waste water recovery system which is simple to install and very easy to maintain.

Yet another object of the present invention is to provide a waste water recovery system which will not contaminate the municipal water system normally supplying a household.

The invention possesses other objects and advantages especially as concerns particular characteristics and features thereof which will become apparent as the specification continues.

BRIEF DESCRIPTION OF THE DRAWINGS

FIG. 2 is a top plan view of the holding tank depicting various conduits and the disinfectant container mounted to the top of the same.

FIG. 3 is a sectional view taken along line 3—3 of FIG. 2.

FIG. 4 is a sectional view taken along line 4—4 of FIG. 2.

For a better understanding of the invention reference is made to the following detailed description of the preferred embodiments thereof which should be referenced to the prior described drawings.

DESCRIPTION OF THE PREFERRED EMBODIMENTS

Various aspects of the present invention will evolve from the detailed description of the preferred embodiments and should be taken in conjunction with the prior described drawings.

Figure 1:
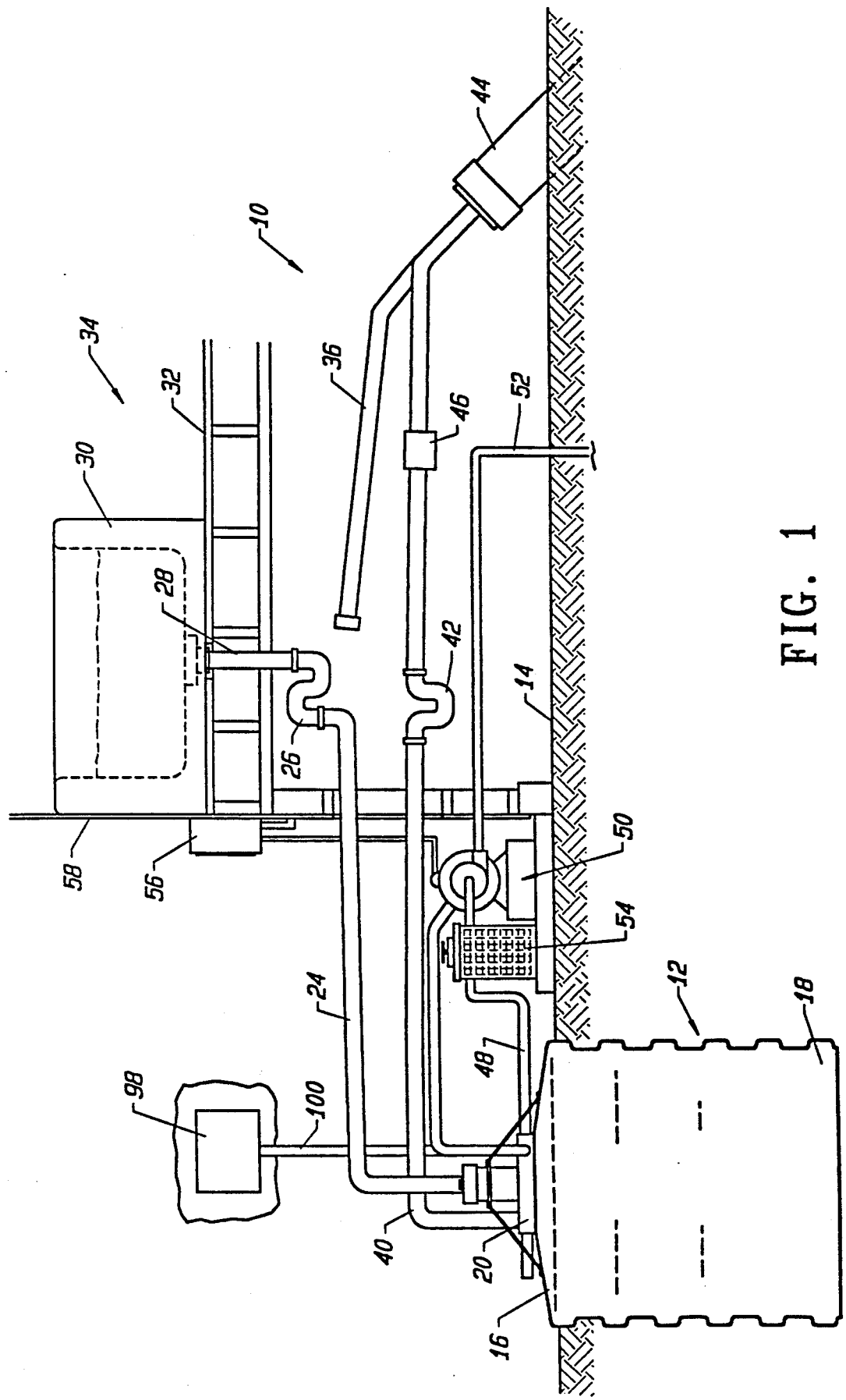
FIG. 1 is a side elevational view of the waste water recovery system of the present invention.

The invention as a whole is depicted in the drawings by reference character 10. The waster recovery system 10, FIG. 1 includes as one of its elements a holding tank 12 which may be constructed of polymeric material and the like. Holding tank 12 is depicted in FIG. 1 as being partially buried beneath surface 14 such that a first upper portion 16 is accessible above ground surface 14. In addition, a second lower portion 18 of holding tank 12 lies beneath ground surface 14. Holding tank 12 is constructed with a circular flange or shoulder 20, FIG. 2, which supports a removable top 22.

Waste water is transported to holding tank 12 via waster water conduit 24. Waste water conduit 24 connects through trap 26 to the outlet 28 of bathtub 30. Bathtub 30 rests on the floor 32 within edifice 34. It may be observed from FIG. 1, the normal connection to sewage system conduit 36 has been interrupted. Directional arrow 38 on FIG. 3 indicates the directional flow of waste water into holding tank 12. Should holding tank 12 become full, overflow conduit 40 directs waste water according to directional arrow 41, FIG. 3, through trap 42 and into sewage system cleanout 44. Check valve 46 prevents any water from the sewage system cleanout passing back into holding tank 12.

Waste water or "gray water" to be used in the reuse entity, such as an irrigation system, leaves holding tank 12 through outlet conduit 48, pump means 50 and irrigation conduit 52. Check valve 51 at the base of conduit 48 biases the flow of waster water to pump means 50. Where irrigation conduit 52 is an existing conduit, the usual source of water to the same would be capped-off in favor of the waste water being delivered by pump 50 through conduit 52. Pump means 50 includes a coarse filter 54 and a timer 56 which may be mounted on wall 58 of edifice 34. Switch means 60 is also employed for activating pump means 50 when holding tank 12 contains a predetermined minimum amount of waste water.

Figure 5:
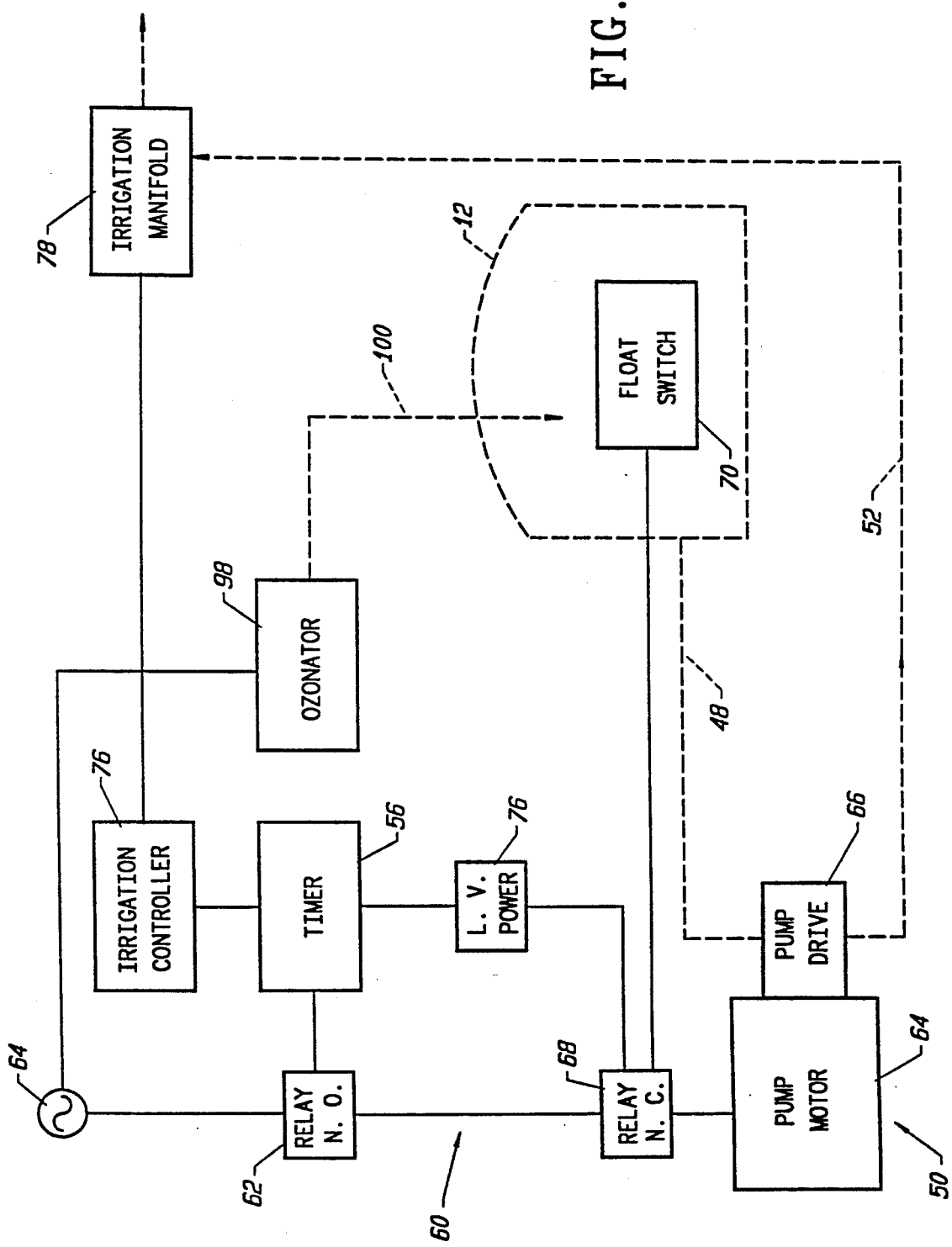
FIG. 5 is a schematic layout representing the interaction between the electrical and hydraulic portions of the system of the present invention.

With reference to FIG. 5, it may be observed that timer 56 activates a relay 62 which is normally open (N.O.). The source of electrical power 64 is then permitted to flow to pump motor 64 which motivates pump drive 66. In addition, switch means 60 includes relay 68 which is normally closed (N.C.) and lies in electrical series with relay 62. Thus, when relay 68 is open, pump motor 64 will not activate. Relay 68 receives a signal from float switch 70 within holding tank 12. Float switch 70 is connected to a conduit 72 supported by flange 20 which also guides conductors 74 to relay 68. Low voltage power supply 76 feeds relay 68 and timer 56 sufficient electrical power, normally 12 volts DC, such that relays 62 and 68 may function. Timer 56 also signals irrigation controller 76, which may be preexisting, to open conventional irrigation manifold valves within irrigation manifold 78.

Means 80 is also included in the present system 10 for treating waste water 82 within holding tank 12, FIG. 3. This treatment would include control of microbial growth and the like. With reference to FIG. 4, it may be observed that a container 84 is depicted in section from FIG. 2. Container 84 includes a disinfectant liquid or solid 86 and is enclosed by a threaded cap 88. Hexagonal protuberance 90 requires the use of a tool to open container 84. Drip valve 92 controls the amount of disinfectant liquid 86 entering holding tank 12. Container 88 lies on the surface of top 22 by the use plurality of straps 94 which fasten to a collar 96 and to the top portion 16 of holding tank 12. In addition, means 80 includes ozonator 98 which is activated by timer 56, FIG. 5. Ozonator 98 powered by AC source 64, produces ozone which passes through conduit 100 and into waste water 82 within holding tank 12.

In operation, the user of system 10 disconnects outlet 28 of tub 30 from sewage system conduit 36. Waster water conduit 24 is then connected to outlet 28 via "P" trap 26. Conduit 24 is directed into holding tank 12 through flange 20. Thus, waste water is permitted to flow from tub 30 to holding tank 12. Means 80 is employed for treating the water within holding tank 12 by the use of disinfectant 86 within container 84 which is fastened to top 22 or upper portion 16 of holding tank 12 by plurality of straps 94. Valve 92 permits delivery of disinfectant 86 at a predetermined rate. Should holding tank 12 become full prior to usage, an overflow conduit 40 is connected through flange 20 permitting waste water to flow to clean out 44 via trap 42 and check valve 46. However, when waste water 82 is to be employed for irrigation, timer 56 activates pump motor 64 through relay 62. Pump drive 66 draws waste water 82 through outlet conduit 48, through coarse filter 54, and finally through irrigation conduit 52. Simultaneously, timer 56 activates irrigation controller 76 which opens the valves found in a conventional irrigation manifold 78 of a typical sprinkler system. Ozonator 98 continually delivers ozone into holding tank 12 through conduit 100. However, should holding tank 12 lack a sufficient amount of water determined by float switch 70, relay 68 would be opened preventing pump means 50 from operating. Vent 49 which also is supported by flange 20 allows air to enter holding tank 12 during the pumping process.

The following table represents a list of typical components found in system 10:

| ITEM | MODEL OR PART # | SOURCE |
| --- | --- | --- |
| 1. Tank 12 (500 gallon) | 500 Q21 | Quadel Industries Inc. Coos Bay, Oregon |
| 2. Pump 54 | 1¼HP, 110AC SRM2 | Jacuzzi, Little Rock, Arkansas |
| 3. Check/Valve 46 | IB904 | Hammond, Hammond, IN. |
| 4. Float Switch 70 | DFD or DFU | S & J Electro Systems, Inc., Detroit Lakes, MN |
| 5. Drip Valve 92 | 5300 | Chicago Specialty Wheeling, IL. |
| 6. Ozonator | Cal Zone | California Acrylic, Pamona, CA. |
| 7. Timer 56 | Longine Model 416 LCD-LG | Garden America, Carson City, NV. |
| 8. Check Valve 51 | 101007 | B & K, Inc. Woodale, IL. |

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A waste water recovery system for transporting given volumes of waste water to a reuse entity, comprising:
   a. a holding tank having an upper portion and an opposite lower portion;
   b. a waste water conduit leading into said holding tank, said waste water conduit carrying a volume of waste water to said holding tank;
   c. means for treating the volume of waste water in said holding tank including means for delivering gaseous ozone to said holding tank;
   d. an outlet conduit, said outlet being capable of transporting waste water from said holding tank to an reuse entity;
   e. an overflow conduit means for transporting waste water from said holding tank to a waste drain when said holding tank is substantially full;
   f. pump means for drawing the volume of waste water from said holding tank through said outlet conduit; and
   g. switch means for activating said pump means only when said holding tank contains a predetermined minimum amount of waste water.

2. The system of claim 1 in which said holding tank additionally comprises a supporting flange extending from said upper portion thereof, said supporting flange holding said waste water conduit and said outlet conduit.

3. The system of claim 1 in which said switch means includes a first switch in series with a second switch for activating said pump means.

4. The system of claim 3 in which said second switch is a floating switch located in said holding tank.

5. The system of claim 1 in which said waste water treating means includes means for selectively delivering disinfecting liquid and solid to said holding tank.

6. The system of claim 5 in which said means for selectively delivering disinfecting liquid and solid to said holding tank includes a container mounted to said upper portion of said holding tank.

7. The system of claim 2 in which said flange forms a closed loop and said container lies within said closed loop.

8. A waste water recovery system for transporting given volumes of waste water to a reuse entity, comprising:
   a. a holding tank having an upper portion and a opposite lower portion;
   b. a waste water conduit leading into said holding tank, said waste water conduit carrying a volume of waste water to said holding tank;
   c. means for treating the volume of waste water in said holding tank;
   d. an outlet conduit, said outlet conduit transporting waste water from said holding tank to an reuse entity;
   e. an overflow conduit means for transporting waste water from said holding tank to a waste drain when said holding tank is substantially full;
   f. pump means for drawing the volume of waste water from said holding tank though said outlet conduit;
   g. switch means for activating said pump means only when said holding tank contains a predetermined minimum amount of the waste water; and
   h. a supporting flange extending from and connected to said upper portion of said holding tank, said supporting flange including means for mounting said waste water conduit said overflow conduit and said outlet conduit.

9. The system of claim 8 which additionally comprises means for delivery disinfecting liquid and solid to said holding tank, including a container mounted to said upper portion of said holding tank, said container lying adjacent said supporting flange.

* * * * *